(12) United States Patent
Borlick et al.

(10) Patent No.: US 11,455,003 B2
(45) Date of Patent: **\*Sep. 27, 2022**

(54) VALIDATION OF CLOCK TO PROVIDE SECURITY FOR TIME LOCKED DATA

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/686,009

(22) Filed: Nov. 15, 2019

(65) Prior Publication Data

US 2020/0081480 A1    Mar. 12, 2020

Related U.S. Application Data

(63) Continuation of application No. 15/589,349, filed on May 8, 2017, now Pat. No. 10,514,721.

(51) Int. Cl.
*G06F 1/14* (2006.01)
*G06F 21/78* (2013.01)
*G06F 21/62* (2013.01)

(52) U.S. Cl.
CPC ............ *G06F 1/14* (2013.01); *G06F 21/6218* (2013.01); *G06F 21/78* (2013.01); *G06F 2221/2111* (2013.01); *G06F 2221/2137* (2013.01)

(58) Field of Classification Search
None
See application file for complete search history.

(56) References Cited

U.S. PATENT DOCUMENTS

| 6,389,420 | B1 | 5/2002 | Vahalia et al. |
| 6,711,687 | B1 | 3/2004 | Sekiguchi |
| 7,010,493 | B2 | 3/2006 | Yamamoto et al. |
| 7,313,557 | B1 | 12/2007 | Noveck |
| 7,340,640 | B1 | 3/2008 | Karr et al. |

(Continued)

OTHER PUBLICATIONS

Response dated Dec. 11, 2020, pp. 9, to Office Action dated Sep. 11, 2020, pp. 29, for U.S. Appl. No. 16/688,722.

(Continued)

*Primary Examiner* — Yaima Rigol
(74) *Attorney, Agent, or Firm* — Konrad Raynes Davda & Victor LLP; Rabindranath Dutta

(57) ABSTRACT

A computational device receives an input/output (I/O) operation directed to a data set. In response to determining that there is a time lock on the data set, a determination is made as to whether a clock of the computational device is providing a correct time. In response to determining that the clock of the computational device is not providing the correct time, the I/O operation is restricted from accessing the data set. In response to determining that the clock of the computational device is providing the correct time, a determination is made from one or more time entries of the time lock whether to provide the I/O operation with access to the data set.

15 Claims, 11 Drawing Sheets

(56) References Cited

U.S. PATENT DOCUMENTS

| | | | |
|---|---|---|---|
| 7,702,909 B2* | 4/2010 | Vainstein | G06F 21/645 |
| | | | 713/178 |
| 8,006,094 B2* | 8/2011 | Savitzky | G06F 21/725 |
| | | | 713/178 |
| 8,185,754 B2 | 5/2012 | Gill et al. | |
| 8,200,774 B1 | 6/2012 | Redstone et al. | |
| 8,423,505 B2 | 4/2013 | Chauvet et al. | |
| 8,732,417 B1 | 5/2014 | Stringham | |
| 8,954,408 B2 | 2/2015 | Dudgeon et al. | |
| 9,075,762 B2 | 7/2015 | Lahousse et al. | |
| 9,218,295 B2 | 12/2015 | Cohen | |
| 9,665,493 B2 | 5/2017 | Ash et al. | |
| 9,697,268 B1 | 7/2017 | Prater et al. | |
| 9,853,949 B1 | 12/2017 | Stickle et al. | |
| 9,875,041 B1 | 1/2018 | Redko et al. | |
| 10,489,080 B2 | 11/2019 | Borlick et al. | |
| 10,514,721 B2 | 12/2019 | Borlick et al. | |
| 10,514,859 B2 | 12/2019 | Borlick et al. | |
| 10,528,435 B2 | 1/2020 | Borlick et al. | |
| 2001/0023421 A1* | 9/2001 | Numao | G06F 21/6218 |
| 2002/0026588 A1 | 2/2002 | Sauvage | |
| 2002/0138691 A1 | 9/2002 | Yamamoto et al. | |
| 2004/0153691 A1 | 8/2004 | Fujimoto et al. | |
| 2005/0050364 A1 | 3/2005 | Feng | |
| 2006/0004862 A1* | 1/2006 | Fisher | G09B 19/00 |
| 2006/0085608 A1 | 4/2006 | Saika | |
| 2006/0095682 A1 | 5/2006 | Fuente et al. | |
| 2007/0124545 A1 | 5/2007 | Blanchard et al. | |
| 2010/0031315 A1 | 2/2010 | Feng et al. | |
| 2010/0037031 A1 | 2/2010 | DeSantis et al. | |
| 2010/0077165 A1 | 3/2010 | Lu et al. | |
| 2010/0169591 A1 | 7/2010 | Atluri et al. | |
| 2010/0223241 A1 | 9/2010 | Hussain et al. | |
| 2010/0250504 A1 | 9/2010 | Balasubramanian et al. | |
| 2011/0173154 A1 | 7/2011 | Chauvet et al. | |
| 2011/0185117 A1 | 7/2011 | Beeston et al. | |
| 2011/0185136 A1 | 7/2011 | Gavrilov et al. | |
| 2011/0185253 A1 | 7/2011 | Resch et al. | |
| 2012/0102350 A1 | 4/2012 | Belluomini et al. | |
| 2013/0031069 A1 | 1/2013 | Dudgeon et al. | |
| 2014/0019699 A1 | 1/2014 | Cohen | |
| 2014/0026002 A1 | 1/2014 | Haines | |
| 2014/0109182 A1 | 4/2014 | Smith et al. | |
| 2015/0100557 A1 | 4/2015 | Golod et al. | |
| 2015/0248333 A1 | 9/2015 | Aravot | |
| 2015/0363125 A1 | 12/2015 | Vijayakumari Rajendran Nair et al. | |
| 2016/0019300 A1 | 1/2016 | Dove et al. | |
| 2016/0036788 A1 | 2/2016 | Conrad et al. | |
| 2016/0098295 A1 | 4/2016 | Ash et al. | |
| 2018/0114387 A1 | 4/2018 | Klink et al. | |
| 2018/0321849 A1 | 11/2018 | Borlick et al. | |
| 2018/0321850 A1 | 11/2018 | Borlick et al. | |
| 2018/0321998 A1 | 11/2018 | Borlick et al. | |
| 2018/0322071 A1 | 11/2018 | Borlick et al. | |
| 2020/0081624 A1 | 3/2020 | Borlick et al. | |
| 2020/0089411 A1 | 3/2020 | Borlick et al. | |
| 2020/0110673 A1 | 4/2020 | Borlick et al. | |

OTHER PUBLICATIONS

Notice of Allowance dated Jan. 13, 2021, pp. 5, for U.S. Appl. No. 16/688,722.
U.S. Appl. No. 16/688,722, filed Nov. 19, 2019.
Preliminary Amendment filed Nov. 15, 2019, pp. 7, for U.S. Appl. No. 16/688,722.
Office Action dated Sep. 11, 2020, pp. 29, for U.S. Appl. No. 16/688,722.
U.S. Appl. No. 16/688,710, filed Nov. 19, 2019.
Preliminary Amendment filed Nov. 19, 2019, pp. 7, for U.S. Appl. No. 16/688,710.
List of IBM Patents or Patent Applications Treated as Related, pp. 2, dated Sep. 14, 2020.
"Enhanced Application Security via Time Constrained Functionality," IP.com No. IPCOM000234628D, Jan. 23, 2014, pp. 4.
R.C. Daley, et al., "A General-purpose File System for Secondary Storage," Proceedings of the Nov. 30-Dec. 1, 1965, Fall Joint Computer Conference, Part I, pp. 213-229, ACM, 1965.
U.S. Appl. No. 15/589,324, filed May 8, 2017.
Office Action dated Dec. 10, 2018, pp. 27, for U.S. Appl. No. 15/589,324.
Response dated Mar. 11, 2019, pp. 10, to Office Action dated Dec. 10, 2018, pp. 27, for U.S. Appl. No. 15/589,324.
Final Office Action dated Jun. 17, 2019, pp. 19, for U.S. Appl. No. 15/589,324.
Response dated Aug. 19, 2019, pp. 11, to Final Office Action dated Jun. 17, 2019, pp. 19, for U.S. Appl. No. 15/589,324.
Notice of Allowance dated Sep. 3, 2019, pp. 13, for U.S. Appl. No. 15/589,324.
U.S. Appl. No. 15/589,341, filed May 8, 2017.
Office Action dated Oct. 19, 2018, pp. 29, for U.S. Appl. No. 15/589,341.
Response dated Jan. 8, 2019, pp. 22, to Office Action dated Oct. 19, 2018, pp. 29, for U.S. Appl. No. 15/589,341.
Notice of Allowance dated Apr. 17, 2019, pp. 27, for U.S. Appl. No. 15/589,341.
Notice of Allowance dated Jul. 25, 2019, pp. 10, for U.S. Appl. No. 15/589,341.
U.S. Appl. No. 15/589,349, filed May 8, 2017.
Office Action dated Sep. 4, 2018, pp. 24, for U.S. Appl. No. 15/589,349.
Response dated Dec. 4, 2018, pp. 12, to Office Action dated Sep. 4, 2018, pp. 24, for U.S. Appl. No. 15/589,349.
Final Office Action dated Jan. 24, 2019, pp. 16, for U.S. Appl. No. 15/589,349.
RCE/Response dated Apr. 24, 2019, pp. 11, to Final Office Action dated Jan. 24, 2019, pp. 16, U.S. Appl. No. 15/589,349.
Notice of Allowance dated Aug. 7, 2019, pp. 17, for U.S. Appl. No. 15/589,349.
U.S. Appl. No. 15/589,373, filed May 8, 2017.
Office Action dated Jul. 16, 2018, pp. 14, for U.S. Appl. No. 15/589,373.
Response dated Oct. 15, 2018, pp. 7, to Office Action dated Jul. 16, 2018, pp. 14, for U.S. Appl. No. 15/589,373.
Final Office Action dated Jan. 18, 2019, pp. 26, for U.S. Appl. No. 15/589,373.
Response dated Apr. 10, 2019, pp. 3, to Final Office Action dated Jan. 18, 2019, pp. 26, for U.S. Appl. No. 15/589,373.
Notice of Allowance dated Aug. 6, 2019, pp. 19, for U.S. Appl. No. 15/589,373.
List of IBM Patents and Applications Treated as Related, pp. 2, dated Nov. 15, 2019.
U.S. Appl. No. 16/683,151, filed Nov. 13, 2019.
Preliminary Amendment filed Nov. 13, 2019, pp. 7, for U.S. Appl. No. 16/683,151, filed Nov. 13, 2019.
Office Action dated Feb. 11, 2021, pp. 32, for U.S. Appl. No. 16/688,710.
Office Action dated Jun. 21, 2021, pp. 40, for U.S. Appl. No. 16/683,151.
Response dated May 11, 2021, pp. 10, to Office Action dated Feb. 11, 2021, pp. 32, for U.S. Appl. No. 16/688,710.
Final Office Action dated Jul. 1, 2021, pp. 34, for U.S. Appl. No. 16/688,710.
Response dated Sep. 21, 2021, pp. 7, to Office Action dated Jun. 21, 2021, pp. 40, for U.S. Appl. No. 16/683,151.
Final Office Action dated Dec. 3, 2021, pp. 19, for U.S. Appl. No. 16/683,151.
Response dated Oct. 13, 2021, pp. 9, to Final Office Action dated Jul. 13, 2021, pp. 29, for U.S. Appl. No. 16/688,710.
Office Action dated Feb. 18, 2022, pp. 37, for U.S. Appl. No. 16/688,710.
Response dated Mar. 3, 2022, pp. 9, to Final Office Action dated Dec. 3, 2021, pp. 19, for U.S. Appl. No. 16/683,151.
Notice of Allowance dated Apr. 5, 2022, pp. 14, for U.S. Appl. No. 16/683,151.

(56) References Cited

OTHER PUBLICATIONS

Response dated May 18, 2022, pp. 9, to Office Action dated Feb. 18, 2022, pp. 37, for U.S. Appl. No. 16/688,710.
Final Office Action dated Jun. 27, 2022, pp. 17, for U.S. Appl. No. 16/688,710.

* cited by examiner

VALIDATION OF CLOCK TO PROVIDE SECURITY FOR TIME LOCKED DATA

CROSS-REFERENCE TO RELATED APPLICATION

This application is a continuation of U.S. patent application Ser. No. 15/589,349, filed May 8, 2017, which application is incorporated herein by reference in its entirety.

BACKGROUND

1. Field

Embodiments relate to validation of clock to provide security for time locked data.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

A time lock is a mechanism that locks data for a period of time. U.S. Pat. No. 9,218,295 describes a method for implementing time locks. U.S. Pat. No. 8,185,754 describes a method for time-based storage access. U.S. Pat. No. 7,313,557 describes a multi-protocol lock manager that manages granting, revoking and releasing of various types of locks on files. U.S. Pat. No. 7,010,493 describes a method for managing access to storage resources according to an access time.

SUMMARY OF THE PREFERRED EMBODIMENTS

Provided are a method, system, and computer program product in which a computational device receives an input/output (I/O) operation directed to a data set. In response to determining that there is a time lock on the data set, a determination is made as to whether a clock of the computational device is providing a correct time. In response to determining that the clock of the computational device is not providing the correct time, the I/O operation is restricted from accessing the data set. In response to determining that the clock of the computational device is providing the correct time, a determination is made from one or more time entries of the time lock whether to provide the I/O operation with access to the data set. As a result, a time locked data set is protected even if the clock of the computational device is changed to indicate an incorrect time.

In further embodiments, the determining of whether the clock of the computation device is providing the correct time is performed by comparing a time provided by the clock of the computational device and a time provided via a Global Positioning System (GPS) receiver of the computational device. As a result, a time determined by the GPS receiver is used to validate the clock of the computational device.

In additional embodiments, the determining of whether the clock of the computation device is providing the correct time is performed by comparing a time provided by the clock of the computational device and a time provided via an atomic clock. As a result, a time determined by an atomic clock is used to validate the clock of the computational device.

In certain embodiments, the determining of whether the clock of the computational device is providing the correct time is performed by comparing a time provided by the clock of the computational device and a time estimated from a log file of the computational device. As a result, a time estimated by a log file is used to validate the clock of the computational device.

In certain embodiments, the log file records times of previous access or attempts to access the data set, and a passage of time in the computational device. As a result, the log file prevents malicious changes to the clock of the computational from accessing time locked data.

In additional embodiments, the determining from one or more time entries of the time lock of whether to provide the I/O operation with access to the data set comprises determining whether the I/O operation meets a criteria provided by the one or more time entries of the time lock. Additionally, in response to determining that the I/O operation meets the criteria provided by the one or more entries of the time lock, the I/O operation is restricted from accessing the data set and an error indicating that the data set is time locked is returned. Furthermore, in response to determining that the I/O operation does not meet the criteria provided by the one or more entries of the time lock, the I/O operation is performed on the data set. As a result, time locked data is not allowed to be accessed based on time entries in the time lock.

In yet additional embodiments, the criteria indicates one or more time durations during which access to the data set is to be prevented. As a result, time locked data is not allowed to be accessed based on time entries that indicate one or more time durations during which access is to be prevented to the data set.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

There may be several reasons for a storage controller to protect data with a time lock. For example, there may be legal reasons to not allow access to data for a certain period of time. In situations where no one accesses certain data during certain periods of time, the time lock may provide a safety mechanism to prevent a breach of access to the data during those times.

For data that may be subject to a time lock (i.e., time locked data) the clock of the computational device that controls the data is very important, as based on the time provided by the clock and the parameters of the time lock, an I/O operation may be allowed or prevented from accessing the data.

However in certain situations the clock may be changed to indicate an incorrect time, via a computer virus, drift of the clock, inadvertent change of time, programmer time, etc. The clock that indicates an incorrect time may allow access to data when the data is time locked.

Certain embodiments provide mechanisms to check whether a clock is correct, prior to allowing access to time locked data. As a result, greater security is provided to time locked data and malicious or inadvertent access to time locked data may be prevented.

Exemplary Embodiments

Figure 1:
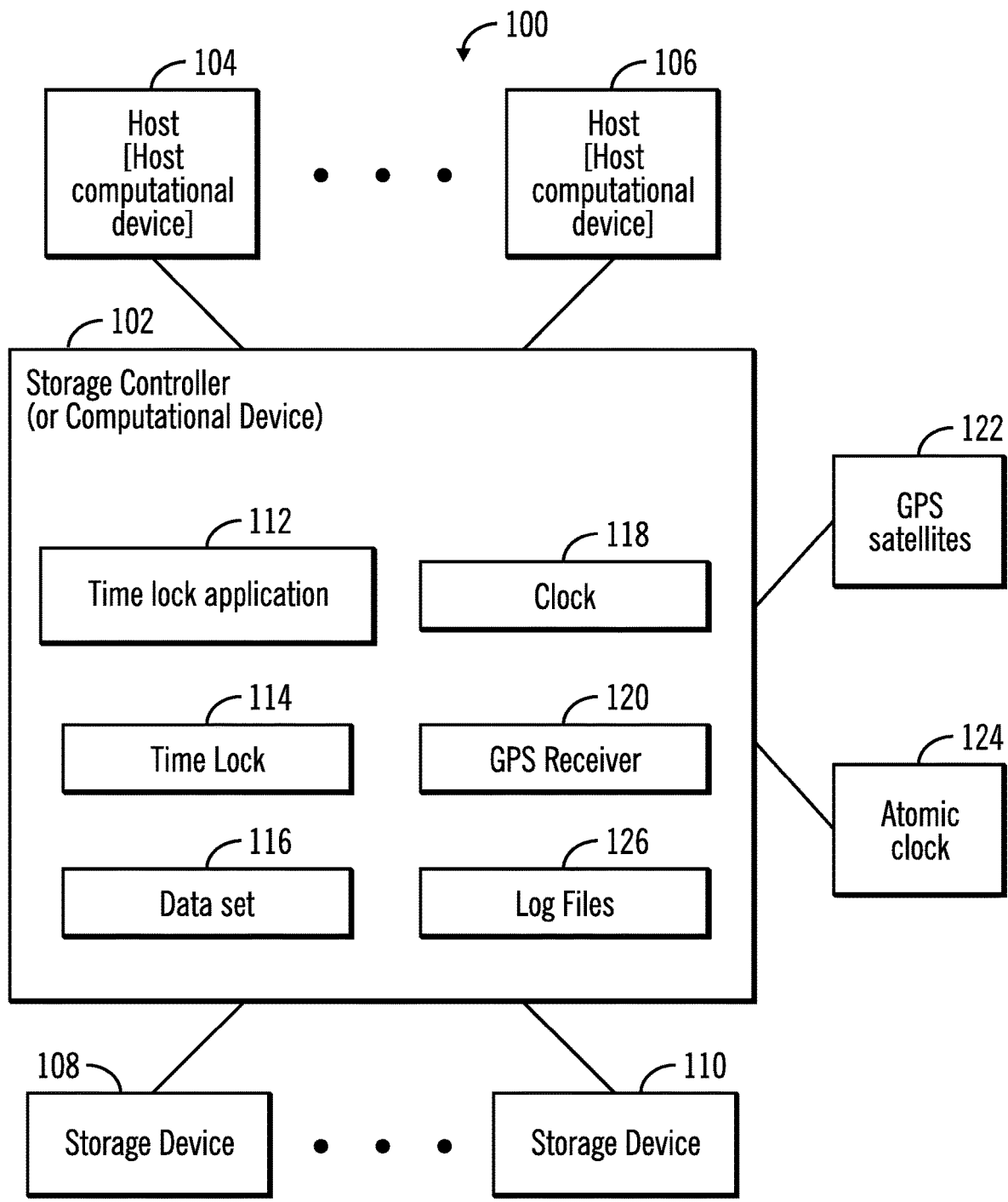
FIG. 1 illustrates a block diagram of a computing environment comprising a storage controller coupled to one or more hosts, and one or more storage devices, for management of time locks, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, a time lock application 112 that executes in the storage controller 102 may generate one or more time locks 114 to protect a data set 116 for one or more predetermined duration of times. The time lock application 112 may be implemented in software, hardware, firmware or any combination thereof.

For data set 116 that may be subject to the time lock 114, the clock 118 of the storage controller 102 is very important, as based on the time provided by the clock 118 and the parameters of the time lock 114, an I/O operation from a host 104, 106 may be allowed or prevented from accessing the data set 116.

However in certain situations the clock 118 may be changed to indicate an incorrect time, via a computer virus, drift of the clock 118, inadvertent change of time by a user or a program, etc. If the clock 118 indicates an incorrect time, the storage controller 102 may allow access to data set 116 when the data is time locked 116.

Certain embodiments provide mechanisms to check whether a clock 118 is correct prior to allowing access to time locked data, by validating the clock 118 against a time provided by a GPS receiver 120 of the storage controller 102 that generates an independent indication of time based on GPS satellites 122. Other embodiments provide mechanisms to check whether the clock 118 is correct prior to allowing access to time locked data, by validating the clock 118 against a time provided by an atomic clock 124 in communication with the storage controller 102 via a network, where the atomic clock 124 generates an independent indication of time. Further embodiments provide mechanisms to check whether the clock 118 is correct prior to allowing access to time locked data, by validating the clock 118 against estimates of time provided by one or more log files 126 maintained in the storage controller 102, where the log files 126 store access times of the data set 116 and also keeps track of the progress of time in the storage controller 102.

Figure 2:
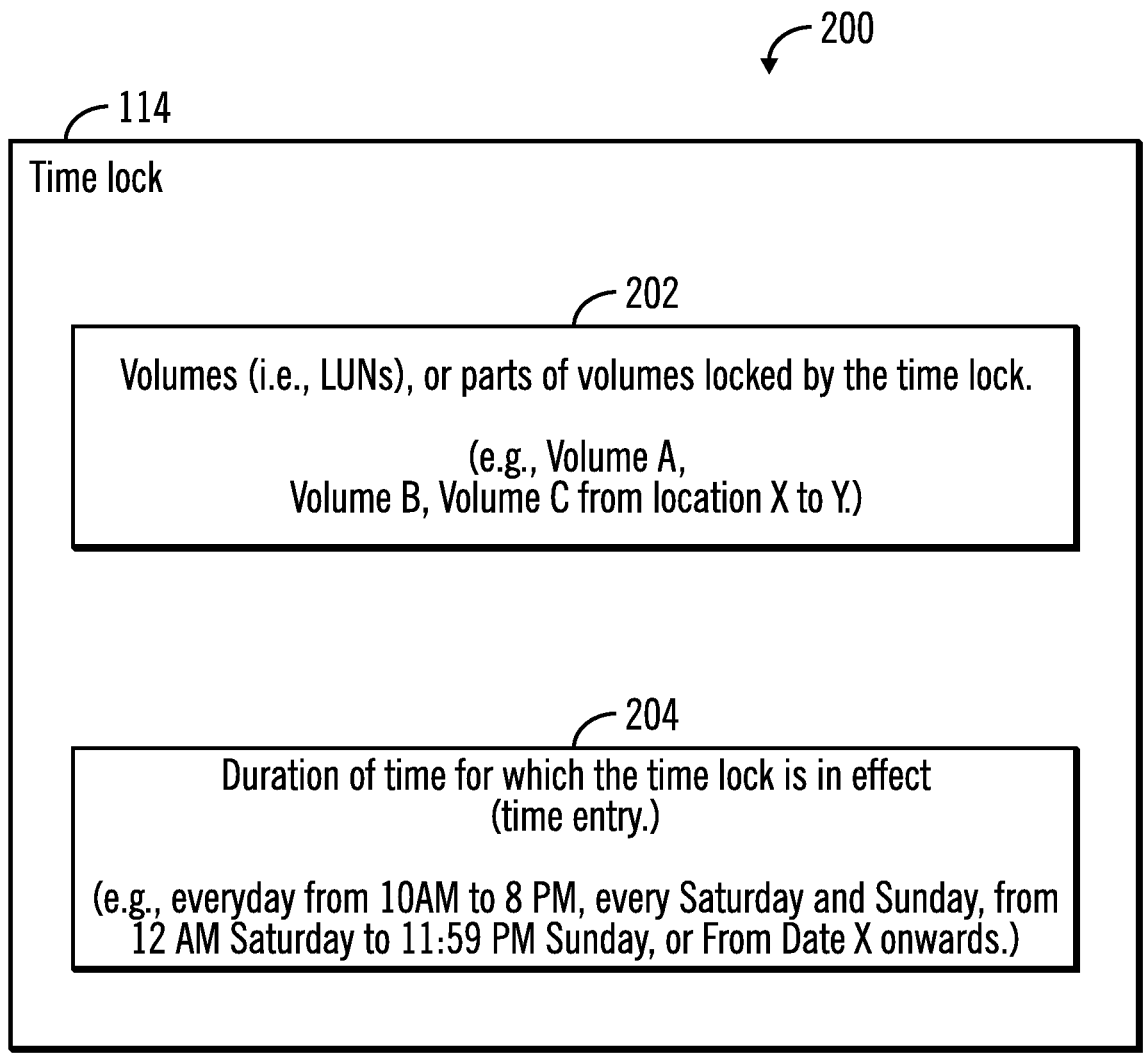
FIG. 2 illustrates a block diagram that shows elements described by an exemplary time lock, in accordance with certain embodiments.

FIG. 2 illustrates a block diagram 200 that shows elements described by an exemplary time lock 114. The time lock 114 may indicate volumes [(i.e., logical units (LUNs)] and/or parts of volumes locked by the time lock 114 (as shown via reference numeral 202). For example, in certain embodiments the time lock 114 may indicate that volume A, volume B, and volume C from location X to location Y are locked by the time lock 114. The data set 116 with which the time lock 114 is associated may be stored in the volumes and/or parts of volumes.

The time lock 114 may also indicate the duration for which the time lock 114 is in effect (as shown via reference numeral 204). For example, in certain embodiments, the time lock 114 may be in effect every day from 10 AM to 8 PM. In other embodiments, the time lock 114 may be in effect for the whole day every Saturday and Sunday. In still further embodiments, the time lock 114 may be in effect from 12 AM Saturday to 11:59 PM Sunday. In yet another embodiment, the time lock may be in effect from Date X onwards (e.g., from Dec. 12, 2017 onwards).

Figure 3:
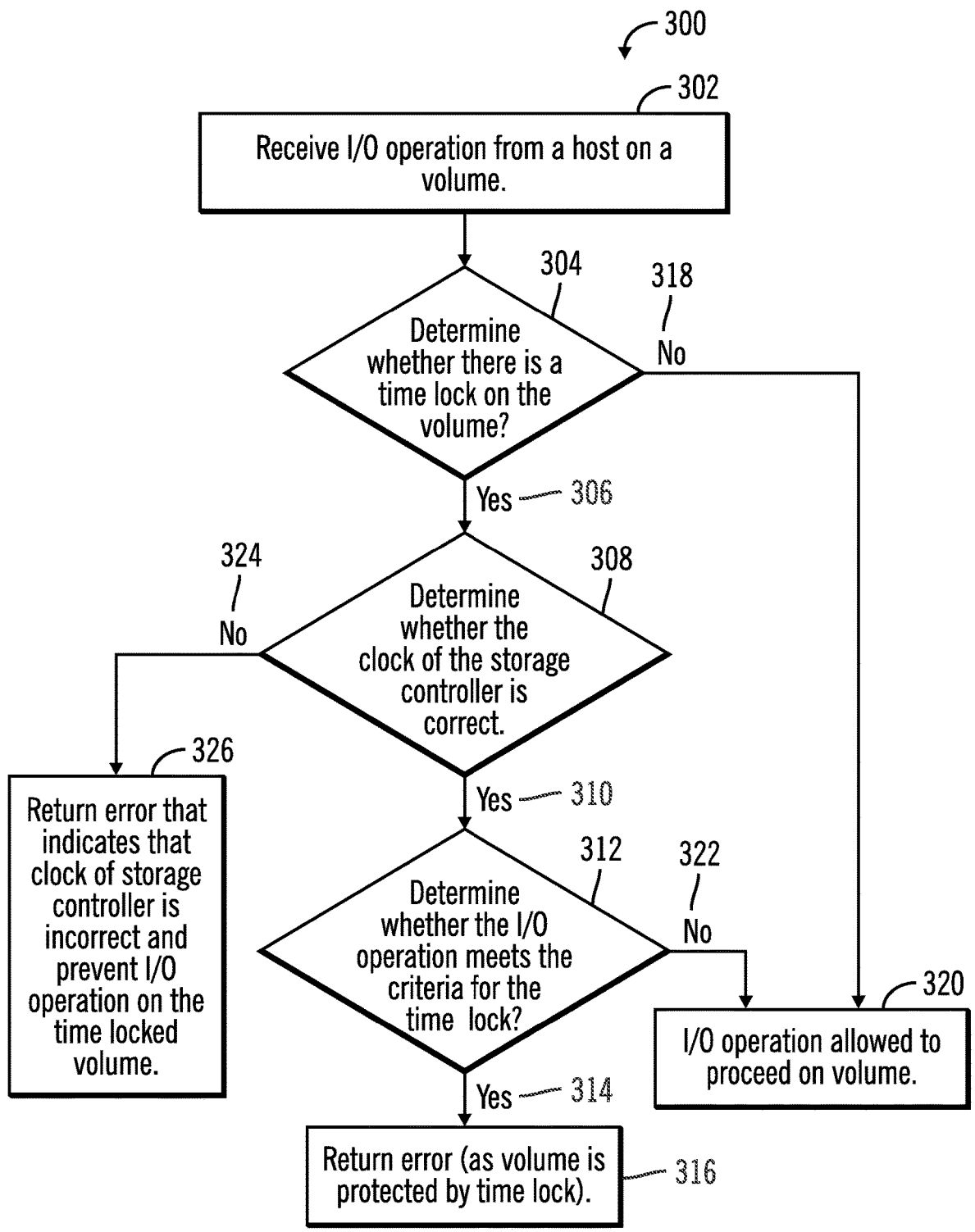
FIG. 3 illustrates a flowchart that shows determining whether the clock of a storage controller is correct before allowing access to time locked data, in accordance with certain embodiments.

FIG. 3 illustrates a flowchart 300 that shows determining whether the clock 118 of a storage controller 102 is correct before allowing access to time locked data, in accordance with certain embodiments. The operations shown in FIG. 3 may be performed by the time lock application 112 that executes in the storage controller 102.

Control starts at block 302 in which storage controller 102 receives an I/O operation on a volume from a host 104. The time lock application 112 determines (at block 304) whether there is a time lock on the volume. If so ("Yes" branch 306) the time lock application 112 determines (at block 308) whether the clock 118 of the storage controller 102 is correct (i.e., the clock 118 shows the correct time).

If at block 308, the time lock application 112 determines that the clock 118 of the storage controller 102 is correct ("Yes" branch 310) control proceeds to block 312 in which the time lock application 112 determines whether the I/O operation meets the criteria for the time locks associated with the volume, by analyzing the time locks associated with the volume. A time lock meets the criteria if all of below conditions are true: (a) The time lock on the volume covers the time of operation; and (b) The time lock covers the entire volume or part of the volume, the I/O operation is intended for.

If the criteria is met ("Yes" branch 314) control proceeds to block 316 in which the storage controller 102 returns an error condition to the host 104 to indicate that the I/O operation cannot be completed because of the time lock associated with the volume.

At block 304, if the volume is not time locked ("No" branch 318) control proceeds to block 320 in which the I/O operation is allowed to proceed. Additionally, if at block 312, if it is determined that the criteria for the time lock is not met ("No" branch 322) then control proceeds to block 320 in which the I/O operation is allowed to proceed.

If at block 308, the time lock application 112 determines that the clock 118 of the storage controller 102 is not correct ("No" branch 324) control proceeds to block 326 in which the time lock application 112 returns an error to the host 104 to indicate that the clock 118 of the storage controller 102 is incorrect. The time lock application 112 also prevents the I/O operation from being performed on the time locked volume.

Therefore, FIG. 3 shows operations in which access to time locked data is not allowed when the clock 118 of the storage controller 102 shows an incorrect time.

Figure 4:
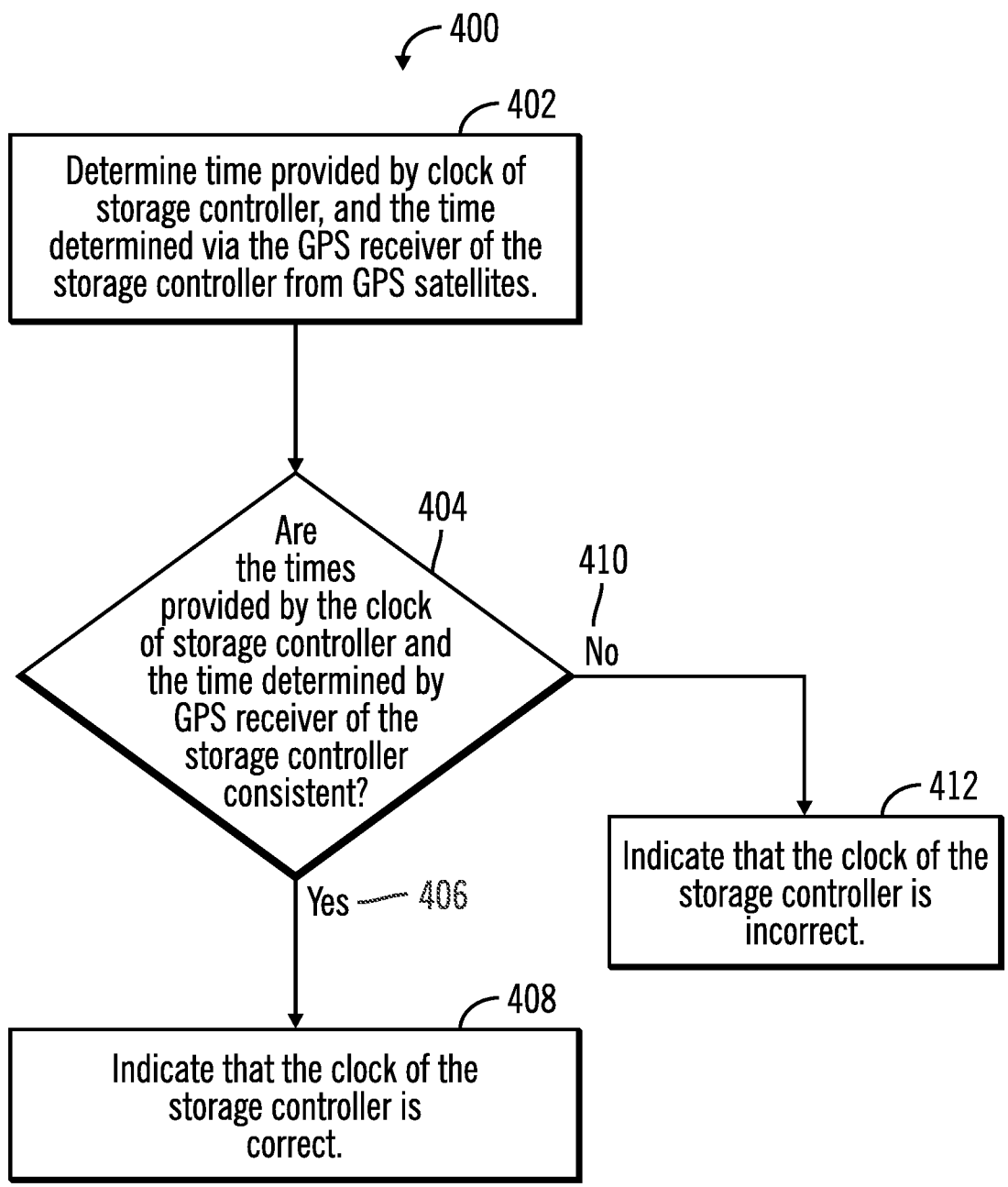
FIG. 4 illustrates a flowchart that shows determining whether the clock of a storage controller is correct, based on GPS data, in accordance with certain embodiments.

FIG. 4 illustrates a flowchart 400 that shows determining whether the clock 118 of a storage controller 102 is correct, based on GPS data, in accordance with certain embodiments. The operations shown in FIG. 4 may be performed by the time lock application 112 that executes in the storage controller 102.

Control starts at block 402 in which the time lock application 112 determines the time provided by the clock 118 of the storage controller 102, and also determines the time determined via the GPS receiver 120 of the storage controller 102 from the GPS satellites 122.

From block 402 control proceeds to block 404 in which the time lock application 112 determines whether the times provided by the clock 118 of the storage controller 102 and the time determined by the GPS receiver 120 are consistent (i.e., the two times are the same or sufficiently close, e.g., the two times do not differ by more than 10 seconds or some other predetermined amount of time).

If so ("Yes" branch 406), control proceeds to block 408 in which the time lock application 112 indicates that the clock 118 of the storage controller 102 is correct. If not ("No" branch 410), control proceeds to block 412 in which the time lock application 112 indicates that the clock 118 of the storage controller 102 is incorrect.

Therefore, FIG. 4 shows operations to validate the clock 118 of the storage controller 102, via the time independently determined by the GPS receiver 120 from the GPS satellites 122.

Figure 5:
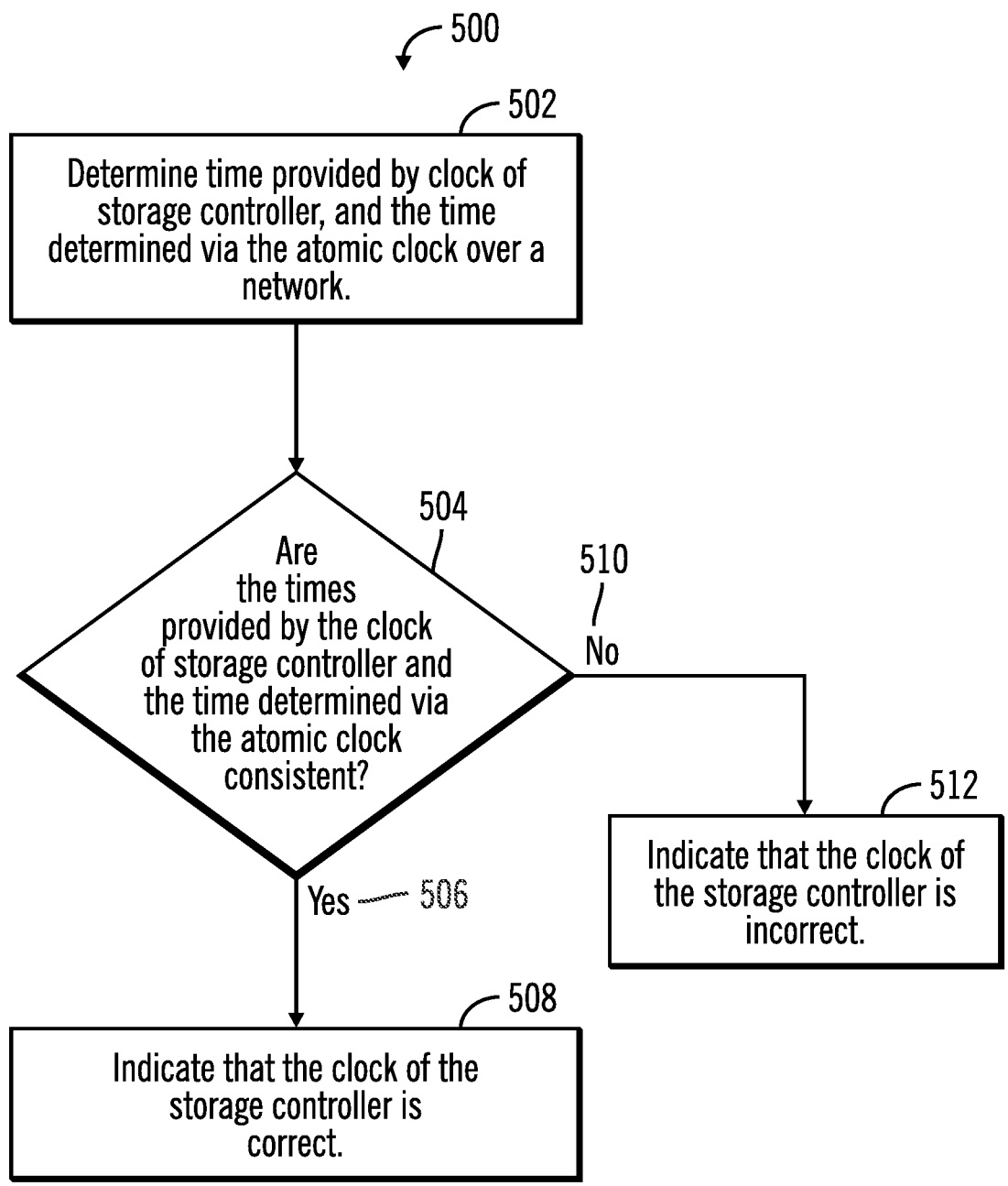
FIG. 5 illustrates a flowchart that shows determining whether the clock of a storage controller is correct, based on an atomic clock, in accordance with certain embodiments.

FIG. 5 illustrates a flowchart 500 that shows determining whether the clock 118 of a storage controller 102 is correct based on an atomic clock 124, in accordance with certain embodiments. The operations shown in FIG. 5 may be performed by the time lock application 112 that executes in the storage controller 102.

Control starts at block 502 in which the time lock application 112 determines the time provided by the clock 118 of the storage controller 102, and also determines the time determined via the atomic clock 124 over a network that couples the atomic clock 124 to the storage controller 102. The storage controller 102 may directly or indirectly via other devices secure the time indicated by the atomic clock 124.

From block 502 control proceeds to block 504 in which the time lock application 112 determines whether the times provided by the clock 118 of the storage controller 102 and the time determined from the atomic clock 124 are consistent (i.e., the two times are the same or sufficiently close, e.g., the two times do not differ by more than 10 seconds).

If so ("Yes" branch 506), control proceeds to block 508 in which the time lock application 112 indicates that the clock 118 of the storage controller 102 is correct. If not ("No" branch 510), control proceeds to block 512 in which the time lock application 112 indicates that the clock 118 of the storage controller 102 is incorrect.

Therefore, FIG. 5 shows operations to validate the clock 118 of the storage controller 102 via the time independently determined by the atomic clock 124.

Figure 6:
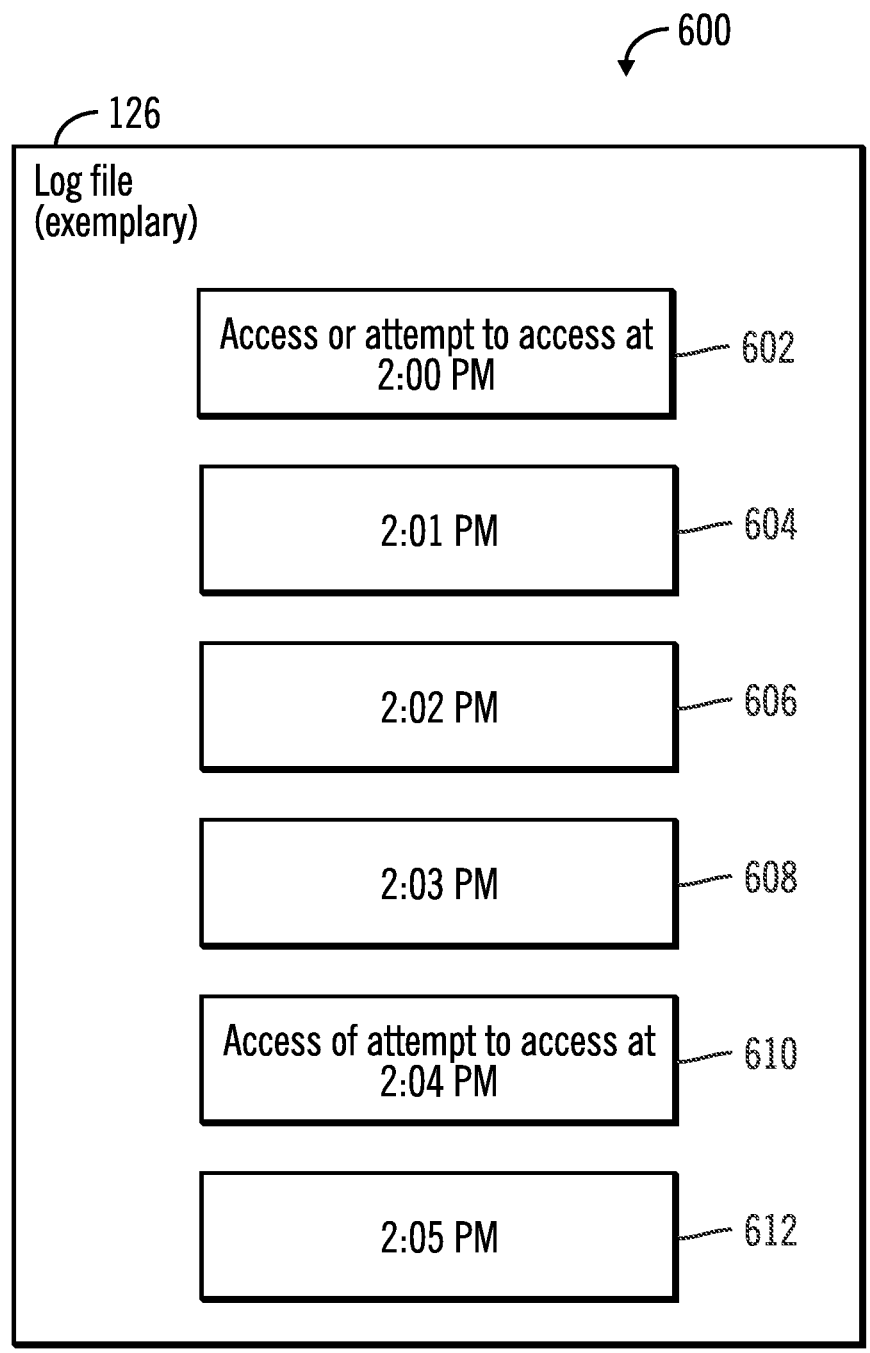
FIG. 6 illustrates a block diagram that shows a log file that records accesses and attempts to access a data set, where the log file keeps track of time, in accordance with certain embodiments.

FIG. 6 illustrates a block diagram 600 that shows a log file 126 that records accesses and attempts to access a data set 116, where the log file 126 keeps track of time, in accordance with certain embodiments (as shown via reference numeral 602, 604, 606, 608, 610, 612).

In the exemplary log file 126, entries are recorded every minute. For example, entry 604 is recorded at 2:01 PM, and entry 606 is recorded at 2:02 PM. If subsequent to the writing of the entry 604 but prior to the writing of entry 606, the clock 118 shows a time of 1 PM of the same day, then it may be concluded that the clock 118 is showing an incorrect time as the previous entry 604 was written at 2:01 PM and the time cannot go back to 1 PM as shown by the clock 118. Instead of clock times, the log file 126 may record a sequence corresponding to the clock times, and if an entry occurs out of sequence, the time lock application 112 may indicate a potentially incorrect clock 118. The time or sequence recordings in the log file 126 is based on the clock 118.

Figure 7:
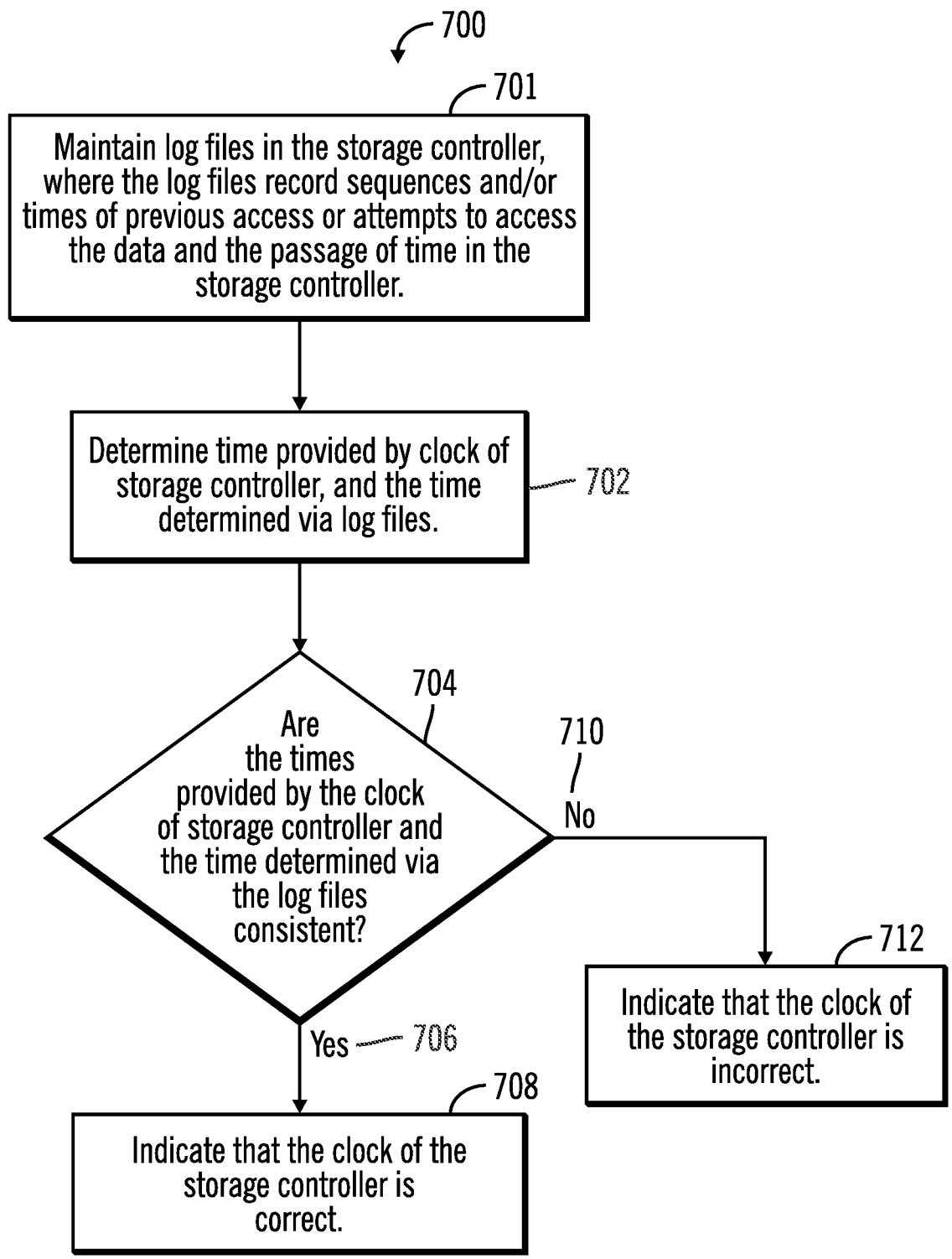
FIG. 7 illustrates a flowchart that shows determining whether the clock of a storage controller is correct, based on the log file, in accordance with certain embodiments.

FIG. 7 illustrates a flowchart 700 that shows determining whether the clock 118 of a storage controller 102 is correct based on the log file 126, in accordance with certain embodiments. The operations shown in FIG. 7 may be performed by the time lock application 112 that executes in the storage controller 102.

Control starts at block 701 in which the time lock application 112 maintains log files 126 in the storage controller 102, where the log files 126 record sequences and/or times of previous access or attempts to access the data set 116, and the passage of time in the storage controller 102. Control proceeds to block 702 in which the time lock application 112 determines the time provided by the clock 118 of the storage controller 102, and also determines the time determined via a log file 126 by examining the last entry of the log file 126 (e.g., entry 612).

From block 702 control proceeds to block 704 in which the time lock application 112 determines whether the times provided by the clock 118 of the storage controller 102 and the time determined from log file 126 are consistent (i.e., the two times are the same or sufficiently close, e.g., the two times do not differ by more than 10 seconds).

If so ("Yes" branch 706), control proceeds to block 708 in which the time lock application 112 indicates that the clock 118 of the storage controller 102 is correct. If not ("No" branch 710), control proceeds to block 712 in which the time lock application 112 indicates that the clock 118 of the storage controller 102 is incorrect.

Therefore, FIG. 7 shows operations to validate the clock 118 of the storage controller 102 via the time independently estimated by the log file 126.

Figure 8:
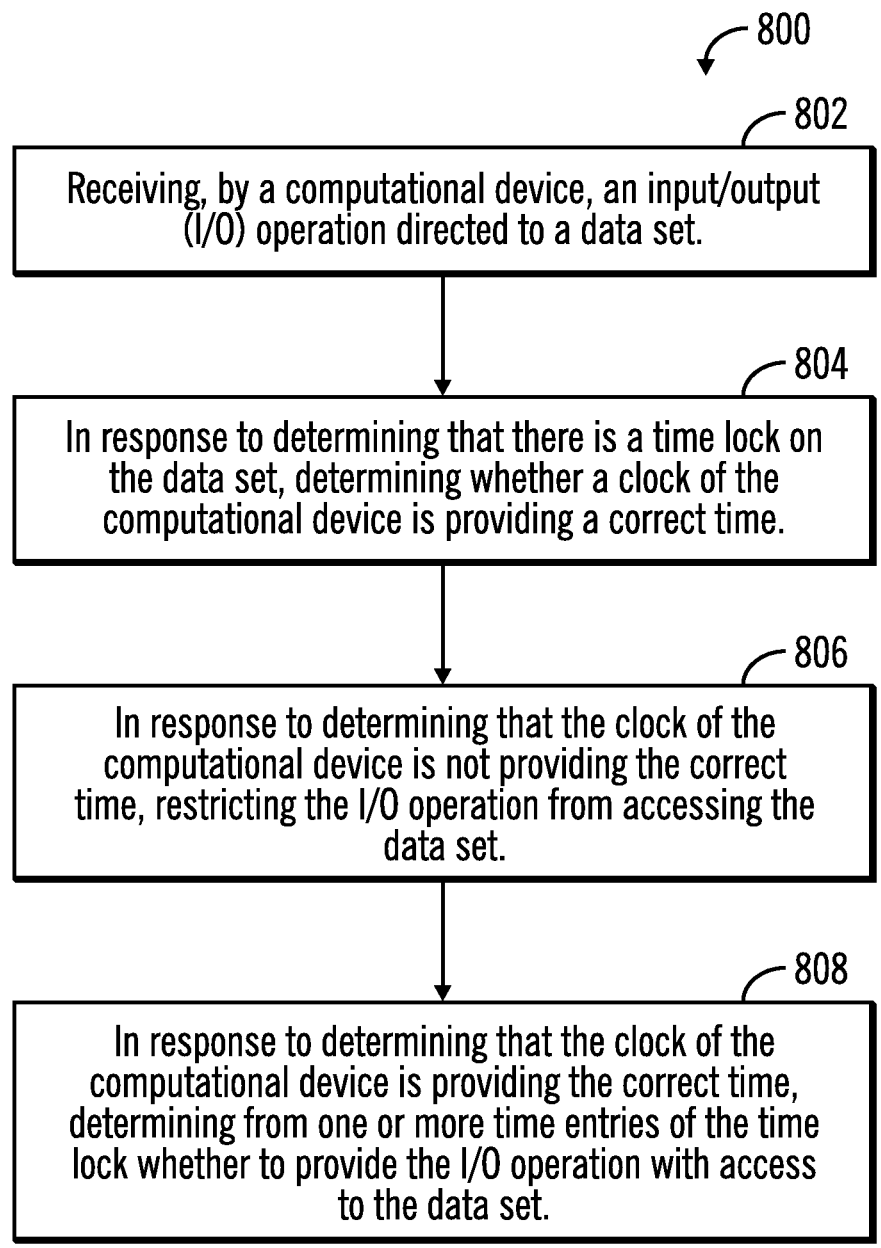
FIG. 8 illustrates a flowchart that shows determining whether a clock of a computational device is correct, prior to allowing access to data that is subject to a time lock, in accordance with certain embodiments.

FIG. 8 illustrates a flowchart 800 that shows determining whether a clock 118 of a computational device 102 (e.g. storage controller 102) is correct, prior to allowing access to time locked data, in accordance with certain embodiments. The operations shown in FIG. 8 may be performed by the time lock application 112 that executes in the storage controller 102.

Control starts at block 802 in which a computational device 102 (e.g., a storage controller 102) receives an input/output (I/O) operation directed to a data set 116. In response to determining that there is a time lock 114 on the data set 116, a determination is made (at block 804) as to whether a clock 118 of the computational device 102 is providing a correct time.

From block 804 control proceeds to block 806, in which in response to determining that the clock 118 of the computational device 102 is not providing the correct time, the I/O operation is restricted from accessing the data set 116. In response to determining that the clock 118 of the computational device 102 is providing the correct time, a determination is made (at block 808) from one or more time entries (e.g. time entry 204) of the time lock 114 whether to provide the I/O operation with access to the data set 116.

Therefore FIGS. 1-8 illustrate certain embodiments in which the time lock application 112 of a storage controller 102 determines whether to allow access to a data set 116 that may be time locked, based on an independent validation of the time indicated by the clock 118 of the storage controller.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
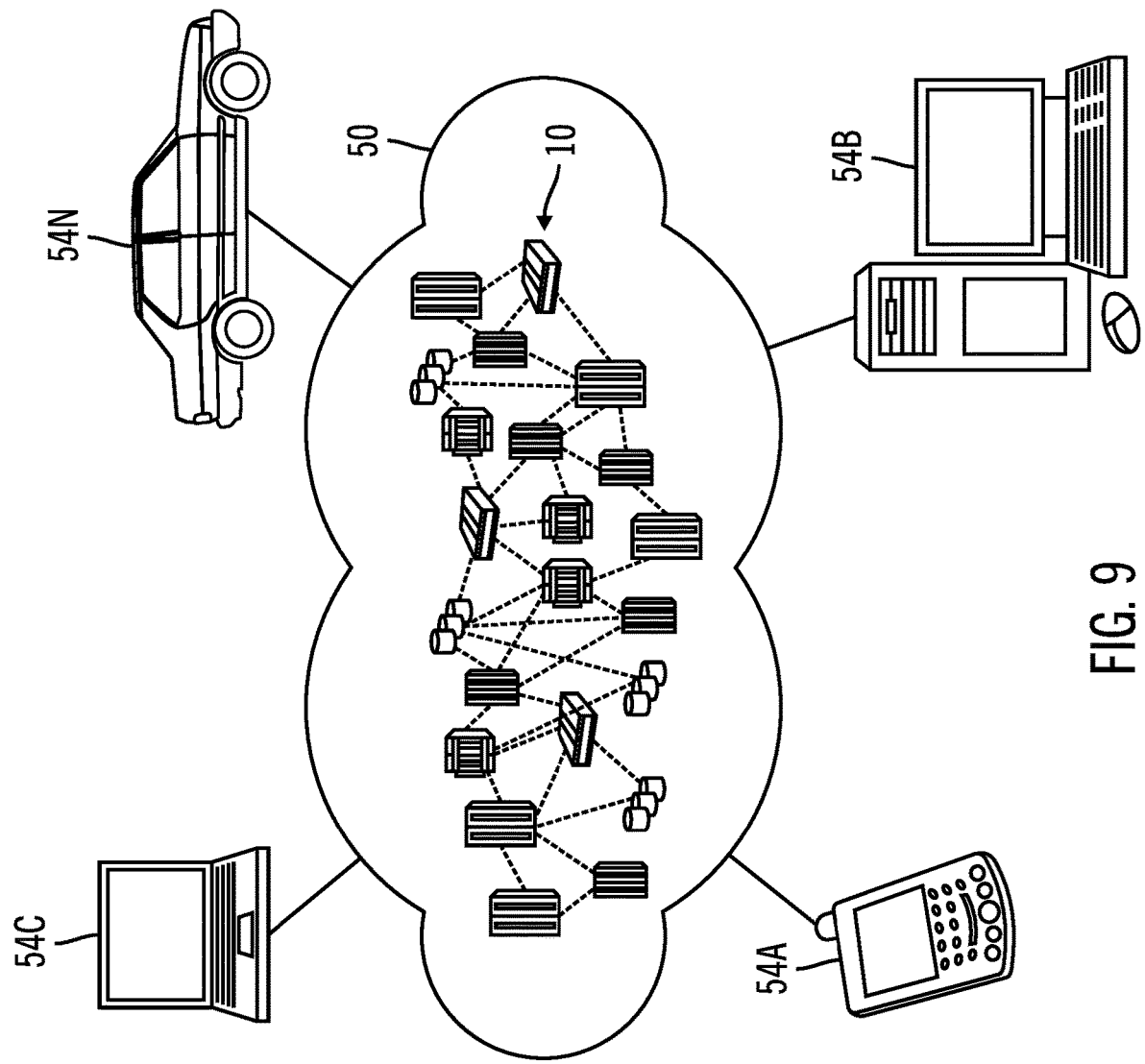
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
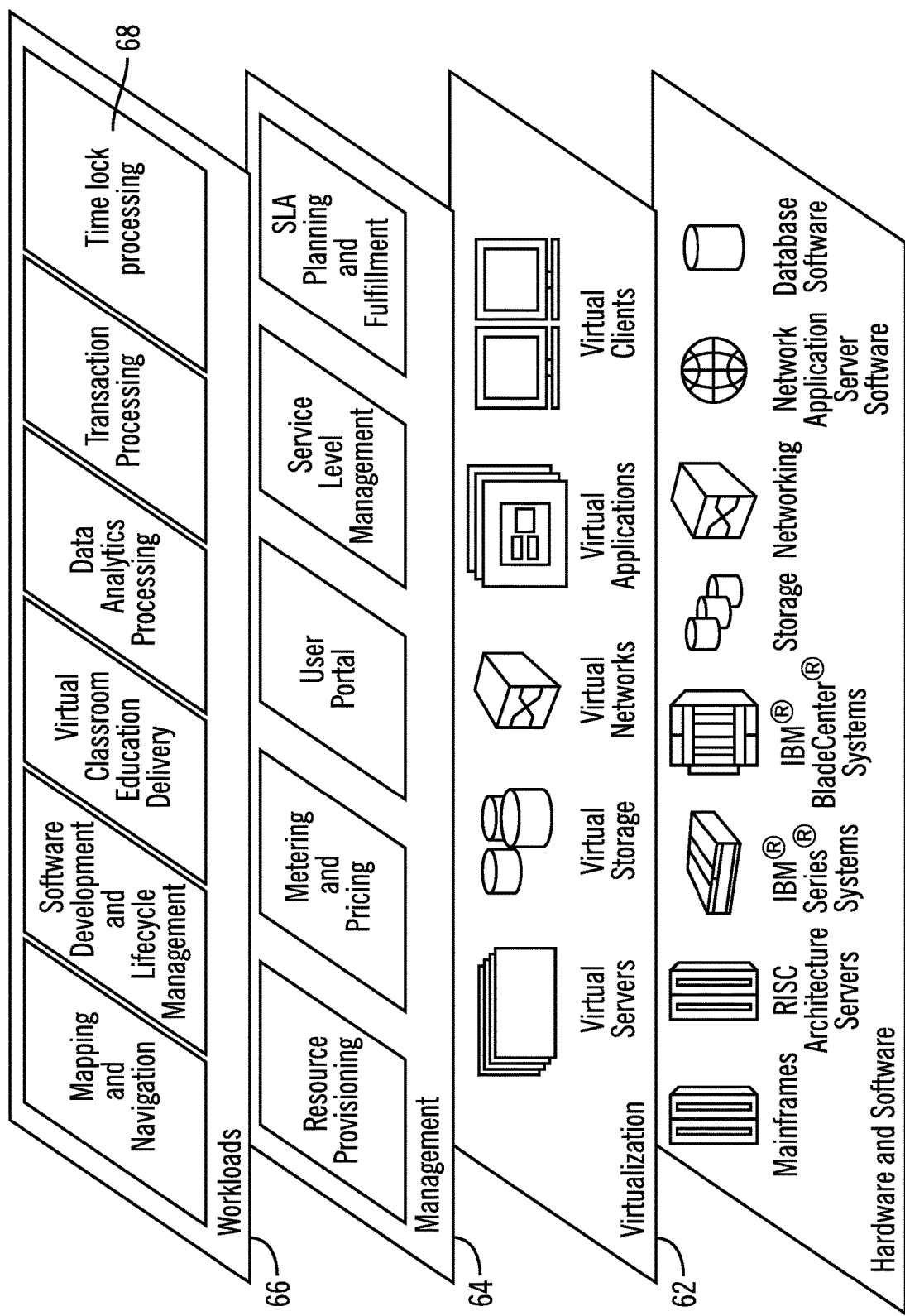
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and time lock processing 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
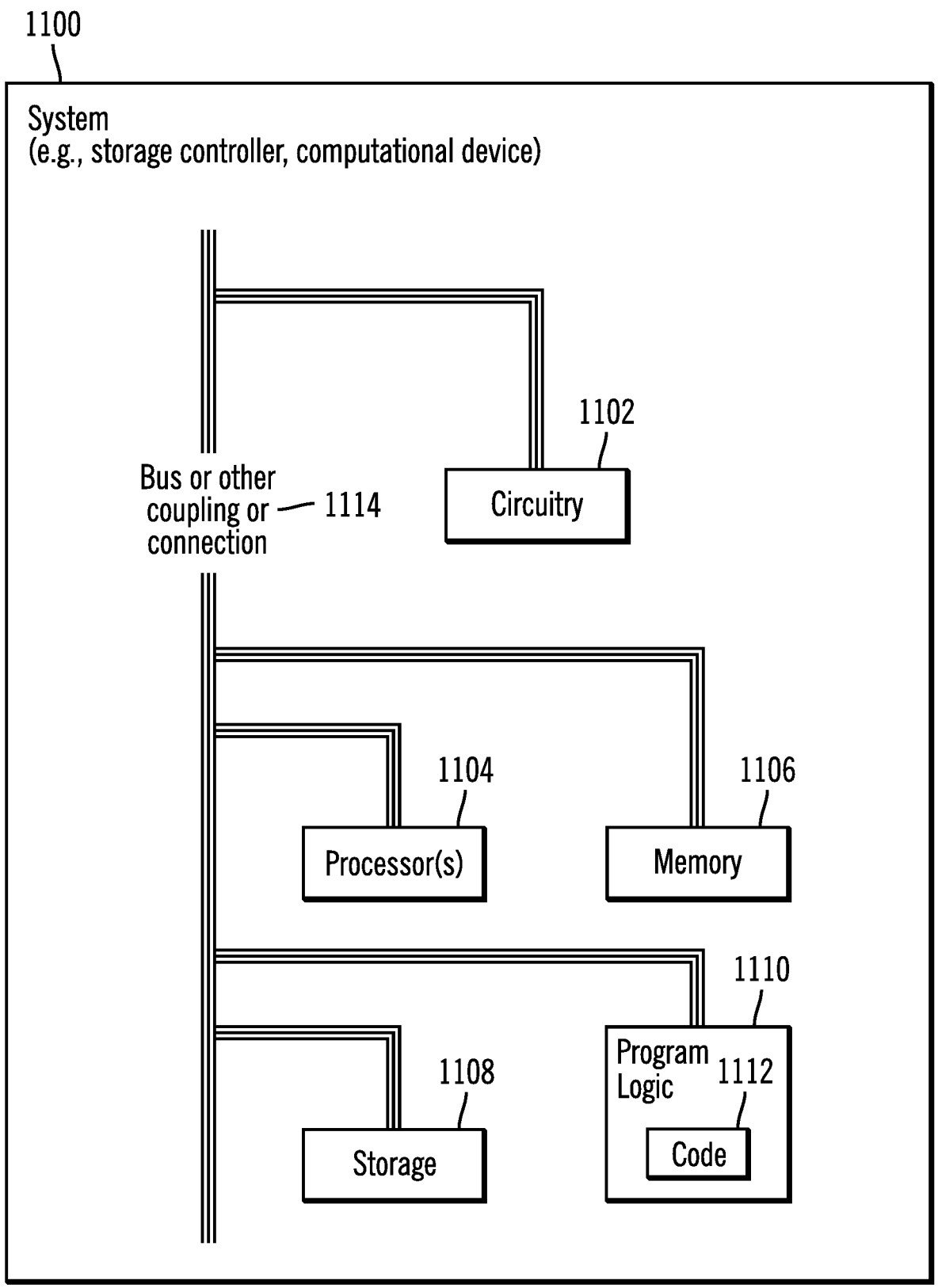
FIG. 11 illustrates a block diagram of a computational system that shows certain elements that may be included in the storage controller or the host, as described in FIGS. 1-10, in accordance with certain embodiments.

FIG. 11 illustrates a block diagram that shows certain elements that may be included in the storage controller 102, the host 104, 106, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising: recording in a log file, sequences and times of previous access and attempts to access a data set, and a passage of time in a computational device; determining a time provided by a clock of the computational device; determining a time via the log file, by examining a last entry of the log file; in response to determining that the time provided by the clock of the computational device and the time determined via the log file differ by more than a predetermined amount of time, determining that the clock of the computational device is not providing a correct time and restricting an input/output (I/O) operation from accessing the data set; and in response to determining that the time provided by the clock of the computational device and the time determined via the log file do not differ by more than the predetermined amount of time, determining that the clock of the computational device is providing the correct time and determining whether to provide the I/O operation with access to the data set.

2. The method of claim 1, wherein determining from one or more time entries of a time lock whether to provide the I/O operation with access to the data set comprises:
 determining whether the I/O operation meets a criteria provided by the one or more time entries of the time lock.

3. The method of claim 2, wherein determining from one or more time entries of the time lock whether to provide the I/O operation with access to the data set further comprises:
 in response to determining that the I/O operation meets the criteria provided by the one or more time entries of the time lock, restricting the I/O operation from accessing the data set and returning an error indicating that the data set is time locked.

4. The method of claim 3, wherein determining from one or more time entries of the time lock whether to provide the I/O operation with access to the data set further comprises:
  in response to determining that the I/O operation does not meet the criteria provided by the one or more time entries of the time lock, performing the I/O operation on the data set.

5. The method of claim 2, wherein the criteria indicates one or more time durations during which access to the data set is to be prevented.

6. A system, comprising:
  a memory; and
  a processor coupled to the memory, wherein the processor performs operations, the operations comprising:
    recording in a log file, sequences and times of previous access and attempts to access a data set, and a passage of time in a computational device;
    determining a time provided by a clock of the computational device;
    determining a time via the log file by examining a last entry of the log file;
    in response to determining that the time provided by the clock of the computational device and the time determined via the log file differ by more than a predetermined amount of time, determining that the clock of the computational device is not providing a correct time and restricting an input/output (PO) operation from accessing the data set; and
    in response to determining that the time provided by the clock of the computational device and the time determined via the log file do not differ by more than the predetermined amount of time, determining that the clock of the computational device is providing the correct time and determining whether to provide the I/O operation with access to the data set.

7. The system of claim 6, wherein determining from one or more time entries of a time lock whether to provide the I/O operation with access to the data set comprises:
  determining whether the I/O operation meets a criteria provided by the one or more time entries of the time lock.

8. The system of claim 7, wherein determining from one or more time entries of the time lock whether to provide the I/O operation with access to the data set further comprises:
  in response to determining that the I/O operation meets the criteria provided by the one or more time entries of the time lock, restricting the I/O operation from accessing the data set and returning an error indicating that the data set is time locked.

9. The system of claim 8, wherein determining from one or more time entries of the time lock whether to provide the I/O operation with access to the data set further comprises:
  in response to determining that the I/O operation does not meet the criteria provided by the one or more time entries of the time lock, performing the I/O operation on the data set.

10. The system of claim 7, wherein the criteria indicates one or more time durations during which access to the data set is to be prevented.

11. A computer program product, the computer program product comprising a computer readable storage medium having computer readable program code embodied therewith, the computer readable program code configured to perform operations on a processor of a computational device, the operations comprising:
  recording in a log file, sequences and times of previous access and attempts to access a data set, and a passage of time in the computational device;
  determining a time provided by a clock of the computational device;
  determining a time via the log file by examining a last entry of the log file;
  in response to determining that the time provided by the clock of the computational device and the time determined via the log file differ by more than a predetermined amount of time, determining that the clock of the computational device is not providing a correct time and restricting an input/output (I/O) operation from accessing the data set; and
  in response to determining that the time provided by the clock of the computational device and the time determined via the log file do not differ by more than the predetermined amount of time, determining that the clock of the computational device is providing the correct time and determining whether to provide the I/O operation with access to the data set.

12. The computer program product of claim 11, wherein determining from one or more time entries of a time lock whether to provide the I/O operation with access to the data set comprises:
  determining whether the I/O operation meets a criteria provided by the one or more time entries of the time lock.

13. The computer program product of claim 12, wherein determining from one or more time entries of the time lock whether to provide the I/O operation with access to the data set further comprises:
  in response to determining that the PO operation meets the criteria provided by the one or more time entries of the time lock, restricting the I/O operation from accessing the data set and returning an error indicating that the data set is time locked.

14. The computer program product of claim 13, wherein determining from one or more time entries of the time lock whether to provide the I/O operation with access to the data set further comprises:
  in response to determining that the I/O operation does not meet the criteria provided by the one or more time entries of the time lock, performing the I/O operation on the data set.

15. The computer program product of claim 12, wherein the criteria indicates one or more time durations during which access to the data set is to be prevented.

* * * * *